(12) United States Patent
Vogel (10) Patent No.: US 9,938,079 B1
(45) Date of Patent: Apr. 10, 2018

(54) AUTOMATED ACCUMULATOR

(71) Applicant: North Central Door Company, LLC, Bemidji, MN (US)

(72) Inventor: Jason D. Vogel, Bemidji, MN (US)

(*) Notice: Subject to any disclaimer, the term of this patent is extended or adjusted under 35 U.S.C. 154(b) by 0 days.

(21) Appl. No.: 15/424,757

(22) Filed: Feb. 3, 2017

Related U.S. Application Data

(60) Provisional application No. 62/373,984, filed on Aug. 12, 2016.

(51) Int. Cl.
| | |
|---|---|
| *B65G 1/127* | (2006.01) |
| *B65G 47/57* | (2006.01) |
| *B65G 1/06* | (2006.01) |
| *B65G 47/51* | (2006.01) |
| *B65G 47/64* | (2006.01) |

(52) U.S. Cl.
CPC ............ *B65G 1/127* (2013.01); *B65G 1/06* (2013.01); *B65G 47/5127* (2013.01); *B65G 47/57* (2013.01); *B65G 47/647* (2013.01)

(58) Field of Classification Search
CPC . B65G 1/026; B65G 1/04; B65G 1/06; B65G 1/127; B65G 1/137; B65G 47/5118; B65G 47/5127; B65G 47/57; B65G 47/547
USPC ...................................................... 198/347.1
See application file for complete search history.

(56) References Cited

U.S. PATENT DOCUMENTS

| | | | | |
|---|---|---|---|---|
| 1,969,276 A | * | 8/1934 | Pevear | ..................... B65G 1/08 193/35 F |
| 3,272,307 A | * | 9/1966 | Waite | ................... B65G 47/647 198/435 |
| 3,580,141 A | * | 5/1971 | Richter | .................. B65H 29/16 198/341.05 |
| 4,609,091 A | | 9/1986 | Dorner | |
| 4,714,152 A | | 12/1987 | Ross | |
| 4,732,256 A | | 3/1988 | Dorner | |
| 4,830,170 A | | 5/1989 | Focke | |
| 5,046,597 A | | 9/1991 | Smith | |
| 5,220,989 A | | 6/1993 | Smith | |
| 5,253,743 A | | 10/1993 | Haas, Sr. et al. | |
| 5,337,880 A | | 8/1994 | Claycomb et al. | |
| 5,350,050 A | | 9/1994 | Franke | |
| 5,636,722 A | | 6/1997 | Koop | |
| 6,158,566 A | | 12/2000 | Pollock | |

(Continued)

*Primary Examiner* — Leslie A Nicholson, III
*Assistant Examiner* — Keith R Campbell
(74) *Attorney, Agent, or Firm* — Albert W. Watkins (57) ABSTRACT

An automated accumulator incorporates independently operated infeed and outfeed ramps. These ramps on an internal end provide access to a plurality of storage flights that define a stacked conveyor, allowing both the upstream and downstream portions of the production line to operate relatively independently of the other. On the external end, the ramps couple to prior art conveyor systems. The automated accumulator incorporates an electronic control system combining a Programmable Logic Controller (PLC) or equivalent and a plurality of sensors in combination with various motors to provide suitable automated operation, including First In First Out (FIFO) operation to preserve production sequence. In addition, various techniques may be used to selectively control operation of the automated accumulator, providing such functions as stopping infeed on a particular product, or providing linear bypass through the accumulator.

15 Claims, 6 Drawing Sheets

(56) References Cited

U.S. PATENT DOCUMENTS

| | | |
|---|---|---|
| 6,609,606 B2 | 8/2003 | Ikegami |
| 6,854,583 B1 | 2/2005 | Horn |
| 7,163,098 B2 | 1/2007 | Ferrari et al. |
| 7,243,513 B2 * | 7/2007 | Kohlman ............ D06B 11/0059 68/205 R |
| 7,775,344 B2 * | 8/2010 | Balk .................... B65G 17/005 198/575 |
| 8,011,492 B2 | 9/2011 | Davi et al. |
| 2015/0226313 A1 * | 8/2015 | Tamura ................ F16H 57/025 74/603 |

* cited by examiner

AUTOMATED ACCUMULATOR

CROSS REFERENCE TO RELATED APPLICATIONS

The present application claims the benefit of U.S. provisional patent application 62/373,984 filed Aug. 12, 2016 of like title and inventorship, the teachings and entire contents which are incorporated herein by reference.

BACKGROUND OF THE INVENTION

1. Field of the Invention

The present invention pertains generally manufacturing equipment such as typically found in a production line, and more particularly to power-driven conveyor systems having an auxiliary section for storing work pieces moving between a source and a destination.

2. Description of the Related Art

In the fabrication of various apparatus, a number of sequential operations may be required. Common practice in such situations is to form a production line, where each of the operations occur in proper sequence along the line. Depending upon the product being produced, either the source materials or particular tooling for these operations may vary. In addition, machinery requires periodic maintenance. In a traditional production line, the entire line must be shut down from beginning to end in order to either make the necessary repairs, tooling changes, or source material changes. As may be appreciated, both these machines and the employees that work on these production lines are very expensive, and are best paid for by the production of finished and saleable product, rather than by sitting idle.

Many production lines have other important requirements. One of these is the proper sequencing and tracking of work pieces. In many cases, the sequence of work pieces must be preserved to ensure that the right work pieces are processed through the right tools. Particularly in the fabrication of metal doors such as overhead doors used in residential and commercial attached and detached garages, loading docks, and for other applications, there may be a variety of style changes that may necessitate tooling and source material changes. As can be appreciated, it would be important to preserve the correct color source material with the correct tooling to impart a particular geometry. For a different door, the color and geometry may change, and so the order of work pieces is critical.

As already noted, there will also be periodic and sometimes sporadic maintenance required. Rather than shutting down the entire production line, it is therefore highly desirable to find ways for the particular maintenance or changes to occur while the remainder of the line remains in operation. In other situations, it may also be desirable to enable one portion of the production line to run, while another portion is shut down. As noted, for some production lines, the order of the work pieces must be preserved even through a temporary shut-down of one part of the production line.

Some artisans have recognized a need for equipment to meet these needs. An exemplary US patent, the teachings and contents which are incorporated herein by reference, is U.S. Pat. No. 5,253,743 by Haas et al, entitled "Wafer block magazine for a short-time intermediate storage of wafer blocks". As described by Haas, wafer blocks may be stored in a magazine. The Haas design has a number of benefits, including the option for linear travel in an uninterrupted manner when no storage is required, and multi-layer in-line storage when needed. However, in the Haas design, each storage layer in the storage magazine is loaded in the horizontal plane of the conveyors into and out of the Haas machine. This means that the input into the magazine and removal therefrom cannot operate independently of each other. Consequently, while parts may be accumulated within the magazine, once the magazine has been filled the infeed must be stopped until the part are removed from the magazine, or the magazine must be completely bypassed. As may be apparent, if the magazine is bypassed, then the sequential order of the wafer blocks is not preserved. If instead the infeed is shut down until the wafer blocks are unloaded form the magazine, then there is less benefit in using the magazine in the first place.

There are a number of other artisans whose teachings offer important history and insight into the making and operation of a conveyor component or system. Exemplary patents, the teachings and contents which are incorporated herein by reference, include: U.S. Pat. No. 1,969,276 by Pevear, entitled "Merchandise handling system"; U.S. Pat. No. 4,609,091 by Dorner, entitled "Storage unit for a conveyor system"; U.S. Pat. No. 4,714,152 by Ross, entitled "Accumulator"; U.S. Pat. No. 4,732,256 by Dorner, entitled "Storage unit for a conveyor system"; U.S. Pat. No. 4,830,170 by Focke, entitled "Process and apparatus for feeding packs to a collecting and packaging station"; U.S. Pat. No. 5,046,597 by Smith, entitled "Modular tray accumulator system"; U.S. Pat. No. 5,220,989 by Smith, entitled "Modular tray accumulator system"; U.S. Pat. No. 5,337,880 by Claycomb et al, entitled "Article storage carousel with automatic conveyor loading and unloading"; U.S. Pat. No. 5,350,050 by Franke, entitled "Continuous vertical conveyor"; U.S. Pat. No. 5,636,722 by Koop, entitled "Store for individual products"; U.S. Pat. No. 6,158,566 by Pollock, entitled "Transfer system for a conveyor"; U.S. Pat. No. 6,609,606 by Ikegami, entitled "Apparatus and method for temporarily retaining articles midway a transport system"; U.S. Pat. No. 6,854,583 by Horn, entitled "Conveyorized storage and transportation system"; U.S. Pat. No. 7,163,098 by Ferrari et al, entitled "Variable-capacity FIFO store with an expulsion station"; and U.S. Pat. No. 8,011,492 by Davi et al, entitled "Device for the accumulation and release of products, especially products arranged in ranks feeding packaging lines for such products".

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is an automated accumulator configured for insertion into an existing production line conveyor system and adapted to selectively accumulate product being conveyed along the existing production line conveyor system. The automated accumulator has a plurality of storage flights that define a stacked conveyor. An infeed ramp has a first end positioned to receive product from the existing production line conveyor system. An infeed ramp second end distal to the infeed ramp first end is adjustable to deliver the product to a one of the plurality of storage flights. An outfeed ramp has a first end positioned to receive product from a one of the plurality of storage flights. An outfeed ramp second end distal to the outfeed ramp first end is adjustable to deliver the product to the existing production line conveyor system downstream of the infeed ramp first end. The infeed ramp second end and the outfeed ramp first end are independently operable to provide access to different ones of the plurality of storage flights, thereby allowing both an upstream and a downstream portion of the production line conveyor system to operate relatively independently of the other.

In a second manifestation, the invention is, in combination, an automated production line accumulator and a production line conveyor system. The production line conveyor system is configured to convey product. The automated production line accumulator has a plurality of storage flights that define a stacked conveyor. An infeed ramp has a first end positioned to receive product from the existing production line conveyor system. An infeed ramp second end distal to the infeed ramp first end is adjustable to deliver the product to a one of the plurality of storage flights. An infeed elevator is configured to raise and lower the infeed ramp second end and responsive thereto deliver product to a one of the plurality of storage flights different from the first one of the plurality of storage flights. An outfeed ramp has a first end positioned to receive product from a second one of the plurality of storage flights. An outfeed ramp second end distal to the outfeed ramp first end is adjustable to deliver the product to the existing production line conveyor system downstream of the infeed ramp first end. An outfeed elevator is configured to raise and lower the outfeed ramp first end and responsive thereto receive product from a one of the plurality of storage flights different from the second one of said plurality of storage flights. An electronic control system is configured to independently operate the infeed ramp second end and outfeed ramp first end to provide access to different ones of the plurality of storage flights and thereby allow both an upstream and a downstream portion of the production line conveyor system to operate relatively independently of the other.

OBJECTS OF THE INVENTION

Exemplary embodiments of the present invention solve inadequacies of the prior art by providing an automated accumulator that is readily interposed within an existing production line conveyor system. The accumulator incorporates a Programmable Logic Controller (PLC) or equivalent and a plurality of sensors in combination with various motors to provide suitable automated operation, including First In First Out (FIFO) operation to preserve production sequence. Independently operated infeed and outfeed ramps provide access to a plurality of storage flights that define a stacked conveyor, allowing both the upstream and downstream portions of the production line to operate relatively independently of the other. In addition, various techniques may be used to selectively control operation of the automated accumulator, providing such functions as stopping infeed on a particular product, or providing linear bypass through the accumulator.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an apparatus that accumulates flat flexible sheet material work pieces in line with the production line, and in a preferred embodiment does so without the need for any additional floor space to install. A second object of the invention is to accumulate work pieces on a first in, first out basis to keep work pieces in a sequential order, thereby ensuring that the work pieces mate up with other appropriate processes. Another object of the present invention is to provide independent operation between the infeed ramp and outfeed ramp, which enables the accumulator to provide continuous infeed of material when the outfeed is stopped and to provide continuous outfeed of material when the infeed is stopped, at least to an extent limited by the capacity of the storage area and demand for or production of work pieces. A further object of the invention is to provide a pass through mode when accumulation is not needed or for work pieces that are longer than the accumulator storage flights. Yet another object of the present invention is to provide an input signal, product counter, indicia reader that can detect a machine readable indicia associated with a work piece, or other means to control the operation of the accumulator as desired. For exemplary purposes only, and not solely limiting the present invention thereto, this control might be stopping the outfeed on the correct sheet to allow for downstream setups or tool changes. This in turn reduces workflow stoppages during material changes and setups which increases production throughput.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides an automated accumulator 100 having a hinged infeed ramp 110, a hinged outfeed ramp 120, and a plurality of stacked conveyors 130 between the infeed and outfeed ramps. Infeed ramp 110, illustrated in slightly enlarged view in FIG. 4, includes a servo motor 112 that turns a lead screw 114, which in turn drives an infeed elevator 140 vertically up and down.

In operation, the infeed elevator 140 is configured to most preferably align with respective individual storage flights that comprise a plurality of horizontal surfaces that each can receive a product sheet 10, and which can convey the product sheet 10 from adjacent the infeed ramp 110 and infeed elevator 140 to adjacent the outfeed ramp 120 and outfeed elevator 150. As illustrated in the Figures, there can be many parallel layers defined by these storage flights, approximately twenty in the illustrations. The exact number and spacing between each storage flight will of course depend upon the particular geometry of product sheets 10 to be processed, as well as the robustness of the powered rollers, belts and idler rollers required to move the product sheets from one end of stacked conveyors 130 to the other. When product sheets 10 are relatively thin, it may be appreciated that the total height of stacked conveyors 130 may be relatively small even with many layers of storage flights therein. By vertically arranging these storage flights, no additional factory floor space is required for the accumulator other than the length of one product sheet 10 and the infeed ramp 110 and outfeed ramp 120.

While servo motor 112 and lead screw 114 are preferred, it will be apparent to those skilled in the art that other types of drive systems may be provided to raise and lower infeed elevator 140. For exemplary and non-limiting purposes, in alternative embodiments pneumatic and hydraulic systems may instead or additionally be provided.

Hinged outfeed ramp 120 has a similar servo motor 122 and lead screw 124 that in combination drive outfeed elevator 150 vertically up and down. Just as with servo motor 112 and lead screw 114, servo motor 122 and lead screw 124 may in alternative embodiments comprise pneumatic and hydraulic systems.

Figure 2:
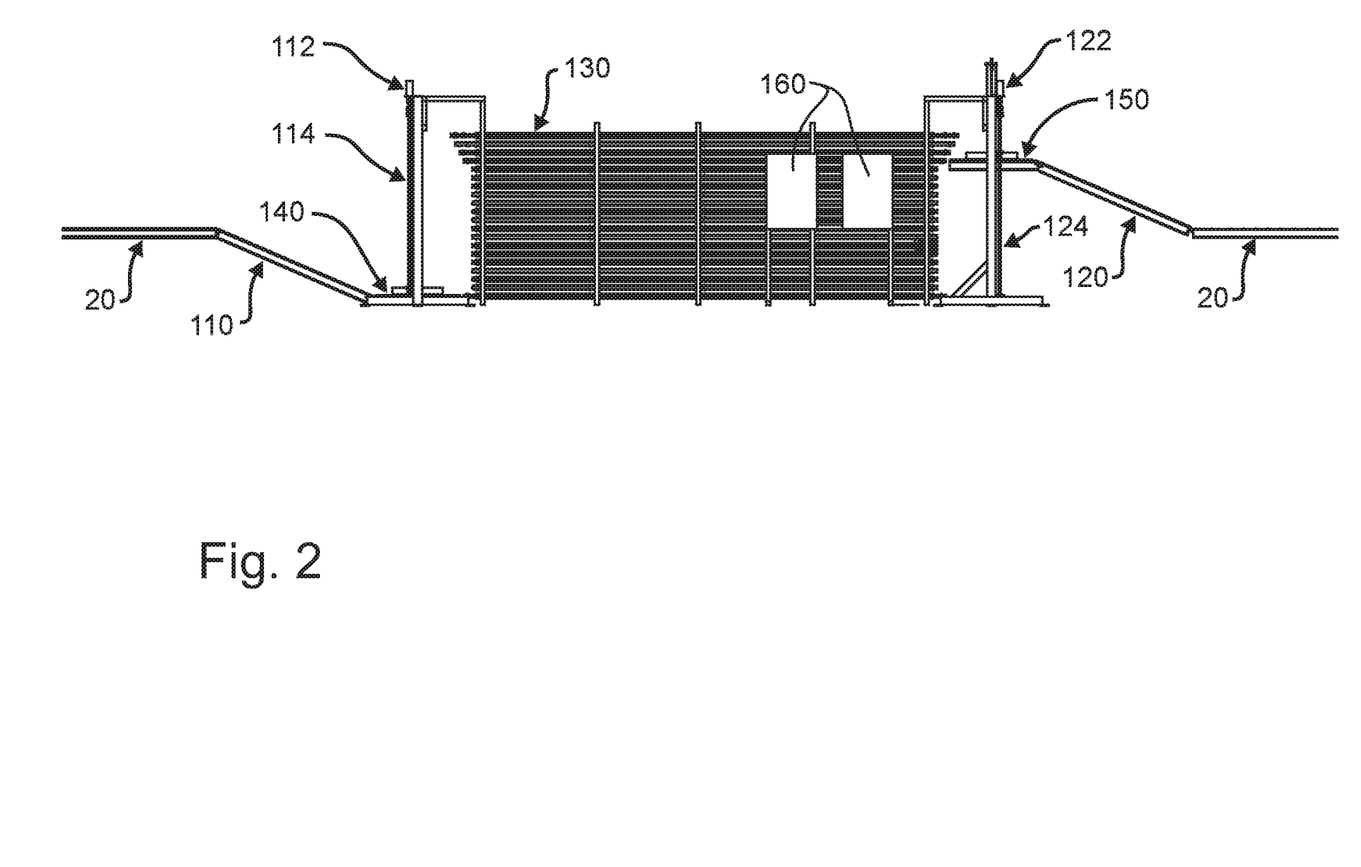
FIG. 2 illustrates the preferred embodiment automated accumulator of FIG. 1 from a side elevational view.
Figure 3:
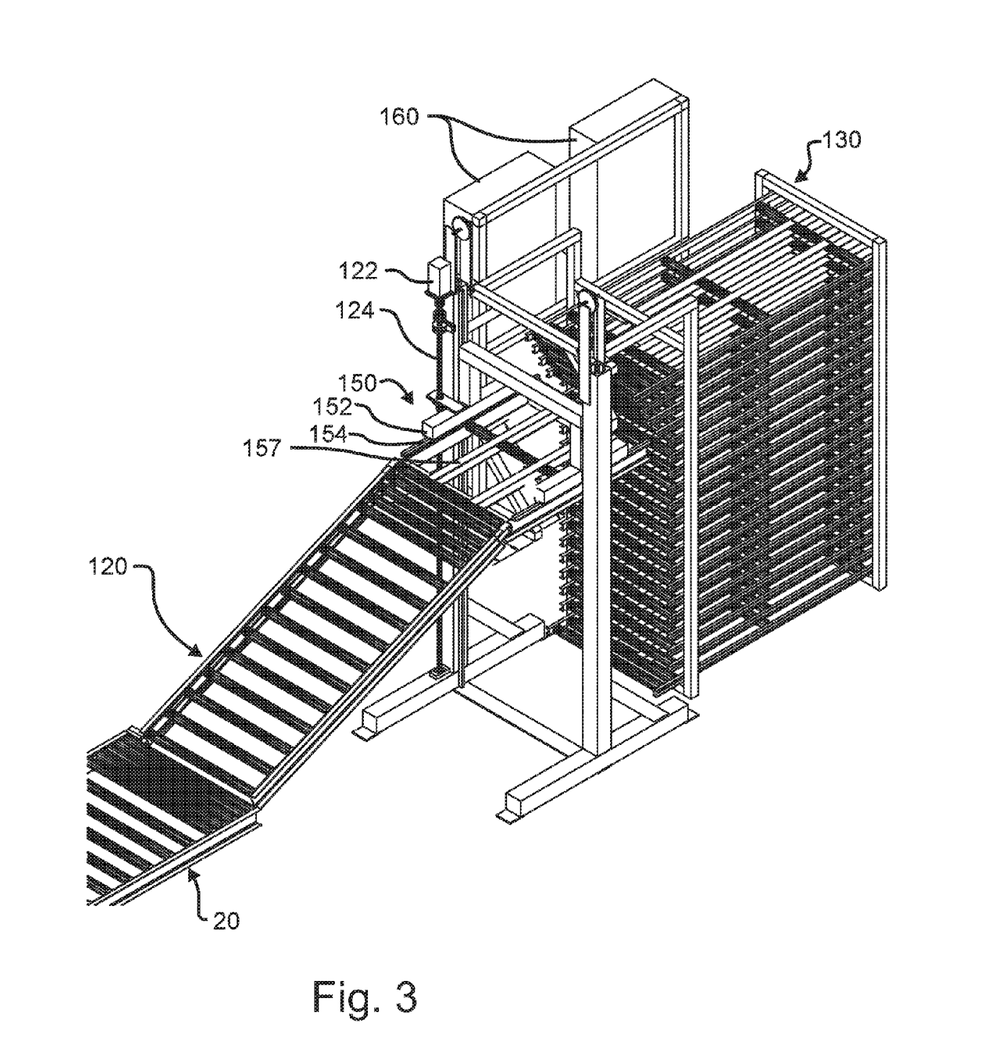
FIG. 3 illustrates the preferred embodiment automated accumulator of FIG. 1 from an enlarged projected view taken from the same viewing angle as that of FIG. 1, illustrating the outfeed ramp and only a portion of the stacked conveyors.

As may be apparent from the illustrations, hinged infeed ramp 110 and hinged outfeed ramp 120 are each hinged at both ends of the ramp. As illustrated in FIG. 2, the ramps are preferably hingedly coupled to prior art live roller conveyors 20 that are able to drive product sheets into and out of preferred embodiment automated accumulator 100. These live roller conveyors 20 may form a part of a prior art conveyor system, and may be at a single intermediate elevation above the ground or factory floor. The hinges allow the ramps 110, 120 to raise or lower relative to the adjacent live roller conveyor 20. A second hinge distal to the live roller conveyors 20 allows the ramps 110, 120 to still couple to the horizontally oriented infeed elevator 140 and outfeed elevator 150.

As will be appreciated then, when ramps 110, 120 are oriented horizontally and in line with the live roller conveyors 20, the hinged end distal to the live roller conveyor 20 will be the farthest away when measured in a horizontal axis. While the preferred embodiment is not that adaptable, it will be apparent that in an extreme if the ramps 110, 120 were oriented entirely vertically, then the hinged ends distal to the live roller conveyors 20 would not be offset at all when measured in a horizontal axis, and instead would only be vertically displaced. In other words, the hinged end of each ramp 110, 120 most distal to the live roller conveyor 20 will trace a generally circular arc. This also means that the end of ramps 110, 120 coupled to elevators 140, 150 will tend to move toward the center of stacked conveyors 130 when in or close to a horizontal plane, and will tend to move away therefrom as they move up or down from the horizontal plane. This also means that, absent additional features found in preferred embodiment automated accumulator 100, the gap between each of the storage flights and the adjacent elevator 140, 150 would change significantly with elevation changes of the elevators. In order to accommodate these changes, infeed elevator 140 is provided with an infeed elevator slide 142 and an infeed elevator track 144 that allows infeed elevator 140 to slide closer to or farther from the closest live roller conveyor 20 as infeed elevator 140 and infeed ramp 110 move up and down. A similar outfeed elevator slide 152 and outfeed elevator track 154 are provide for outfeed elevator 150, which serves like purpose to the like infeed elevator slide and track 142, 144.

Since infeed and outfeed elevators 140, 150 shift in a horizontal plane, this would cause the gap to vary between individual storage flights and the elevators 140, 150. Instead, the individual storage flights are extended where consequentially vertically shifted from within or close to the elevation of the live roller conveyors 20. This means that from a side view as illustrated in FIG. 2, the individual storage flights are not the same length along their respective longitudinal axes, and instead are longer when more vertically displaced. This creates an arch-like pattern when viewed from the side.

Infeed elevator 140 in preferred embodiment automated accumulator 100 is provided with a combination of powered rollers 146, belts 147 and idler rollers 148 as desired by a designer familiar with conveyor technology and as also described and understood in the patents incorporated by reference herein above, to meet the needs of a particular product sheet 10 and production line. Similar powered rollers 156, belts 157, and idler rollers 158 may be provided with outfeed elevator 150 as desired. Further, motive power can be provided by clutches and a single motor, or a plurality of individually controlled motors, once again as will be understood by a reasonably skilled designer after reviewing the present disclosure. In preferred embodiment automated accumulator 100, internally powered DC drive rollers power each flight that preferably reduces maintenance, space, and overall size compare to other drive configurations.

Figure 6:
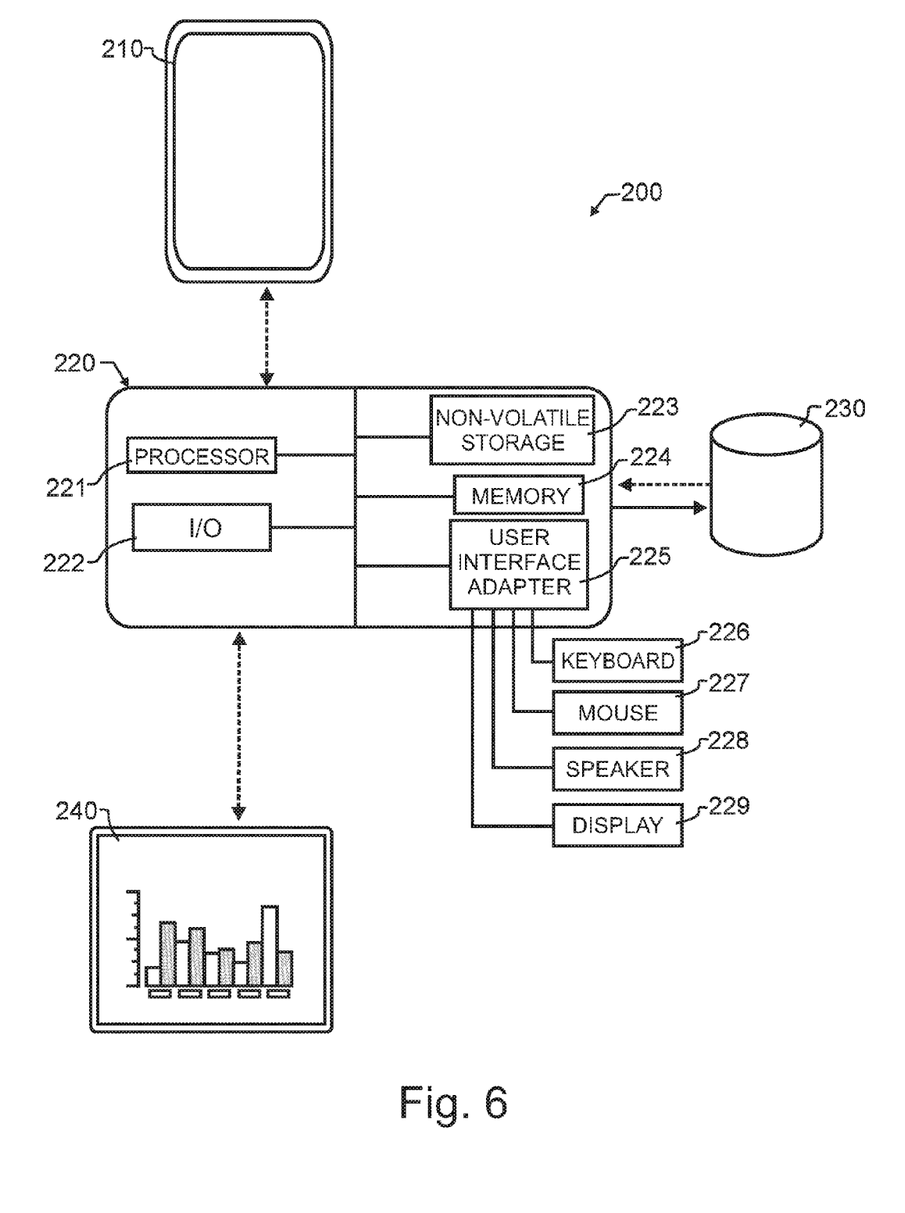
FIG. 6 schematically illustrates a preferred embodiment electronic control system useful to provide automated control within the preferred embodiment automated accumulator of FIG. 1 designed in accord with the teachings of the present invention.

In preferred embodiment automated accumulator 100, handles product sheets 10 are stored in and removed from accumulator 100 on a First In, First Out (FIFO) basis in order to keep sequential order to the sheets and thereby ensure that the work pieces mate up with other appropriate processes. In order to do so, automated accumulator 100 may for exemplary purposes be controlled with a preferred embodiment electronic control system 200 such as illustrated in FIG. 6, which may for exemplary purposes incorporate a Programmable Logic Controller (PLC). Sensors are preferably provided that can give the PLC feedback as to the position and quantity of product sheets 10 approaching, leaving or in storage. The PLC is configured to activate the various motors to perform the required storage and retrieval tasks. As already described herein above, the hinged infeed and outfeed ramps 110, 120 use servo motors 112, 122 respectively to drive lead screws 114, 124 respectively to accurately position the ramps in line with each storage flight. The infeed and outfeed ramps 110, 120 and each storage flight have powered rollers with belts transmitting power to idler rollers that make them live roller conveyors.

Product sheets 10 are conveyed to infeed ramp 110 using live roller conveyors 20. When each sheet has been conveyed by infeed ramp 110 and entered into a storage flight within stacked conveyors 130, the infeed ramp 110 may preferably index up to the next storage flight by using servo motor 112 to turn lead screw 114, which in turn is preferably connected to a nut or other similar threaded apparatus affixed to infeed elevator 140. This causes infeed elevator 140 to precisely move up and into ready position for the next product sheet 10 to be conveyed in. When infeed elevator 140 has indexed to and filled the top storage flight, infeed elevator 140 will then be indexed to the bottom storage flight and used to continue filling storage flights in the order they are received, until the accumulator is full or otherwise stopped.

Outfeed elevator 150 starts out lined up with the product sheet 10 that is needed next, or, in the preferred embodiment, that was first to be stored into stacked conveyors 130. When the downstream production line equipment is ready for the next product sheet 10, the powered rollers 156 and belts 157 on outfeed elevator 150, powered rollers 126 provided on hinged outfeed ramp 120, and similar powered rollers 136 and belts 137 provided within the storage flight of stacked conveyors 130 it is lined up with are activated. This activation causes product sheets 10 to be conveyed from the storage flight out, across outfeed elevator 150 and outfeed ramp 120, and on to downstream production line equipment. After product sheet 10 has left the storage flight, outfeed elevator 150 indexes up to the next flight, ready for the next sheet to be conveyed out, by using servo motor 122 to turn lead screw 124, which in turn is preferably connected to a nut or other similar threaded apparatus affixed to outfeed elevator 150. This causes outfeed elevator 150 to precisely move up and into ready position for the next product sheet 10 to be conveyed out. When the outfeed ramp 120 has delivered the product sheet 10 in the top flight, it is indexed to the bottom flight and continues delivering product sheets 10 in the order they were received until the stacked conveyors 130 are empty. During continuous use, preferred embodiment automated accumulator 100 may not completely fill or empty, but it will always keep product sheets 10 in sequential order.

There are times, such as the switching from the production of one style or color of door to another different style or color, where it will be desirable to temporarily hold product within preferred embodiment automated accumulator 100, and thereby temporarily prevent product sheets 10 from being fed further downstream in the production line. In such case, various techniques may be used to selectively control operation of the automated accumulator, providing such functions as stopping infeed on a particular product, or providing linear bypass through the accumulator.

Techniques that may be used, for exemplary and non-limiting purpose, include using the sensors described herein above that provide the PLC feedback as to the position and quantity of product sheets 10 approaching, leaving or in storage to monitor and count the product sheets 10 received within preferred embodiment automated accumulator 100. At a predetermined count, which might be determined by operator control or again for exemplary and non-limiting purposes by an order quantity, the PLC might, for exemplary purposes only and not limiting the present invention solely thereto, signal automated accumulator 100 to store this particular product sheet 10 and some subsequent additional product sheets 10 within preferred embodiment automated accumulator 100.

In one alternative embodiment, this control might be initiated by an input signal such as from an operator controlled switch, rather than through a count. Such switch might not only be useful for ordinary flow control, but would also be beneficial in the case of unexpected events along the line that may require unexpected product accumulation.

Figure 4:
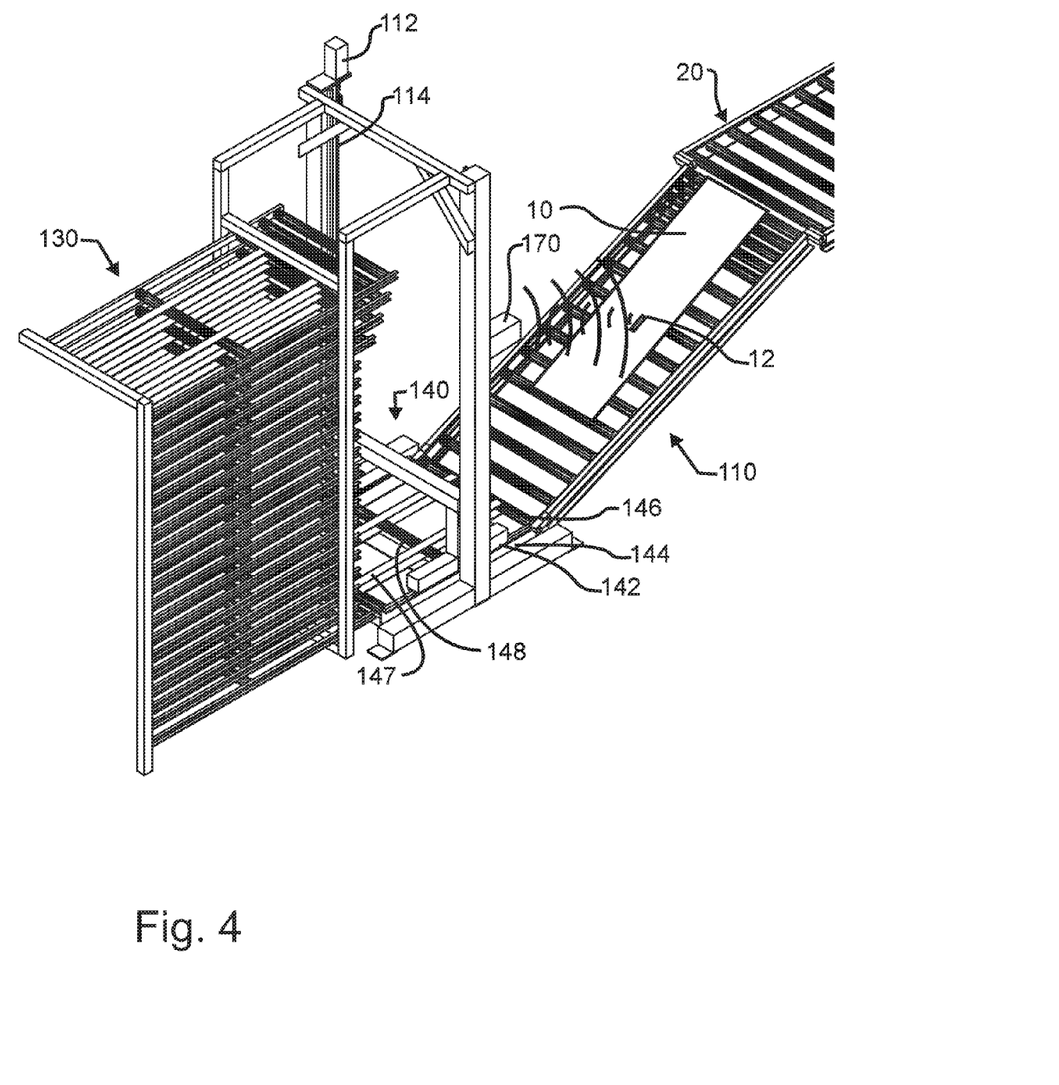
FIG. 4 illustrates the preferred embodiment automated accumulator of FIG. 1 from an enlarged projected view taken from the same viewing angle as that of FIG. 1, illustrating the infeed ramp and only a portion of the stacked conveyors.
Figure 5:
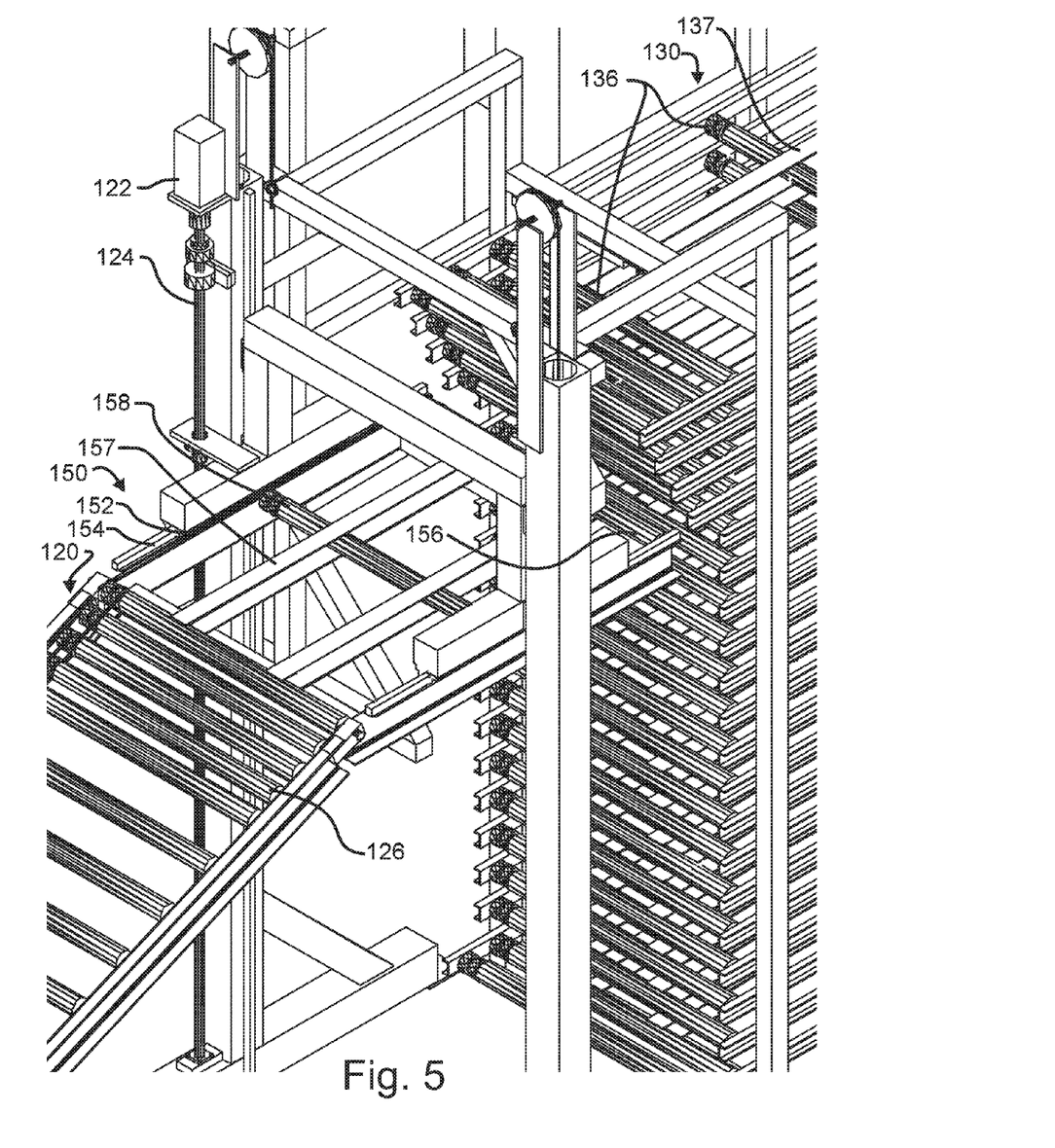
FIG. 5 illustrates the preferred embodiment automated accumulator of FIG. 1 from a more enlarged projected view but taken from the same viewing angle as that of FIG. 3, illustrating the sliding outfeed elevator in much greater detail.

In another alternative embodiment, illustrated for exemplary purposes in FIG. 4, an operator or a machine may apply to a product sheet 10 a machine readable indicia 12. Preferably, an indicia reader 170 may be provided that can detect the presence of machine readable indicia 12. This detection of a particular machine readable indicia 12 may be used to trigger other actions controlled by the PLC, for exemplary purposes only and not limiting the present invention solely thereto, to signal to automated accumulator 100 to store this particular product sheet 10 and subsequent sheets thereto within preferred embodiment automated accumulator 100.

In addition to accumulating products from the infeed side into the plurality of stacked conveyors 130, preferred embodiment automated accumulator 100 also may be used to supply product sheets 10 to the downstream side of a production conveyor system even when there are no product sheets 10 being received on the infeed side. This independent operation between infeed ramp 110 and outfeed ramp 120, enables the accumulator to provide continuous infeed of material when the outfeed is stopped and to provide continuous outfeed of material when the infeed is stopped, at least to an extent limited by the capacity of the storage area and demand for or production of work pieces. This in turn reduces workflow stoppages during material changes and setups which increases production throughput of a production line.

As may be appreciated, when preferred embodiment automated accumulator 100 is not needed to accumulate product sheets 10, the PLC may also be configured to instead set both the infeed elevator 140 and outfeed elevator 150 to be in line with the same storage flight, and all product sheets passing through preferred embodiment automated accumulator 100 may do so without any storage occurring. This may also be advantageous, for exemplary and non-limiting purpose, when product sheets longer than the storage flights must pass through. In such case, infeed ramp 110 and outfeed ramp 120 will preferably be set to a level in line or nearly in line with the live roller conveyors 20 illustrated in FIG. 2, so that the product sheets 10 can stay in one continuous horizontal plane, or nearly so.

As may also be appreciated, a number of additional electrical and electronic devices are required to perform the control functions described herein. Where appropriate, these electrical and electronic devices may be stored within one or more electrical control panels 160.

Figure 1:
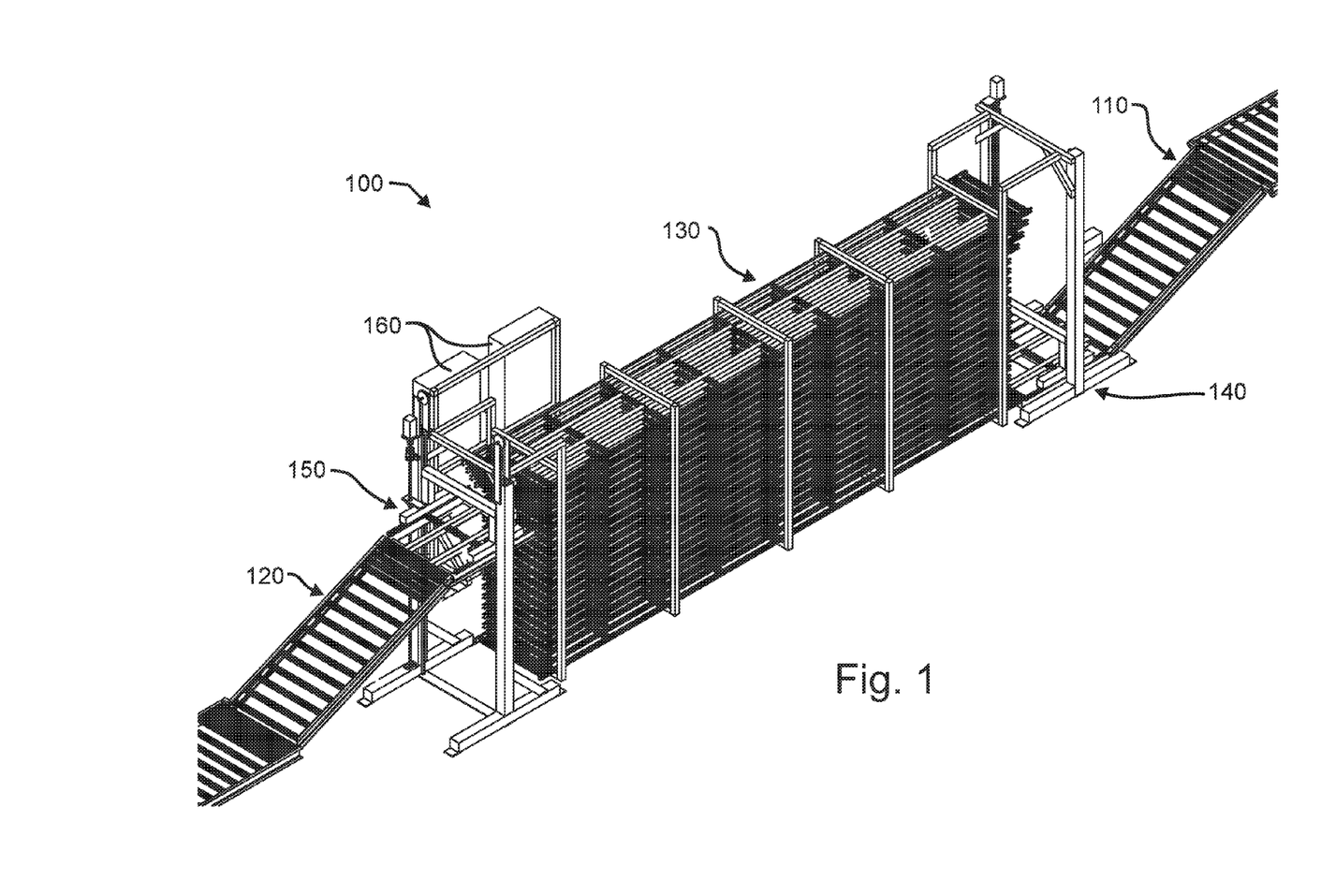
FIG. 1 illustrates a preferred embodiment automated accumulator designed in accord with the teachings of the present invention from a projected view.

For exemplary purposes only, and not solely limiting thereto, a preferred embodiment electronic control system 200 may be used to provide automated control within the preferred embodiment automated accumulator 100 of FIG. 1. At the heart of electronic control system 200 is a computing system 220. Computing system 220 in preferred embodiment automated accumulator 100 comprises a stand-alone system entirely contained within electrical control panels 160. However, in alternative embodiments contemplated herein, computing system 220 may comprise some combination of local and remote computing, including but not limited to a remote web server. Computing system 220 will preferably have some combination of one or more processors 221. Processor 221 may take many forms. In preferred embodiment automated accumulator 100, processor 221 comprises a Programmable Logic Controller (PLC), which is commonly configured and optimized for industrial control. However, in alternative embodiments, processor 221 may comprise a single microprocessor or dedicated controller, a central processing unit (CPU), one or more sets of parallel processors, one or more reduced instruction set controllers (RISC), a digital signal processor (DSP), an application specific integrated circuit (ASIC), a field programmable gate array (FPGA) or other programmable logic device, discrete gate or transistor logic, discrete hardware components, distributed processors which are either local or distributed through a network, a neural network, or any of the others of the myriad of known processing techniques or any combination thereof designed to perform the functions described herein.

Computing system 220 in preferred embodiment automated accumulator 100 will also comprise an I/O communications system 222 which allows electronic communication to and from external or remote electronic devices. Most particularly, I/O communications system 222 will include a plurality of relays, or in substitution for one or more of the plurality of relays, one or more electronic motor controls. These will be used to control the operation of servo motors 112, 122, and powered rollers 146, 156 as required for proper operation of preferred embodiment automated accumulator 100. In alternative embodiments, other types of I/O communications may also be provided, including for exemplary and non-limiting purposes, communications systems that permit remote communications and monitoring, such as various wired or wireless ports including RS-232, LAN, Internet, or like communications apparatus.

Non-volatile storage 223 might house low level operating components such as BIOS and the like or other relatively static system components, and may optionally be used to store preferred applications software designed in accord with the teachings of the present invention, if so desired. The command instructions are most preferably executed by processor 221 utilizing memory 224 such as RAM for data storage required during program execution.

An optional user interface adapter 225 might, for exemplary purposes, include one or more of a keyboard 226, mouse 227, speaker 228, and display 229 that might be multi-purpose, such as a touch screen display or the like. User interface adapter 225 might, for exemplary and non-limiting purposes, comprise a Universal Serial Bus (USB) interface, or might alternatively comprise a Bluetooth™ Low Energy or other suitable wireless link.

Computing system 220 in one alternative embodiment may communicate with a database 230 as needed to store and retrieve data. Storage may preferably be provided for all data that is not transient with a single session, and may for exemplary purposes include operations and performance data, account, or job tracking information, and appropriate analytic data. The storage within database 230 may take place as a part of or within computing systems 220, or as a separate structure housed near to computing systems 220, or even as a remote storage such as through a cloud server.

In further alternative embodiments, additional computing, display, and data entry apparatuses 210 and 240 may be provided for interaction with computing system 220. While not separately illustrated, it will be apparent that computing, display, and data entry apparatuses 210 and 240 may have architecture that is functionally similar to that of computing system 220 as illustrated.

Analysis of data and operations may be performed directly within computing device 220, or may be again be allocated to a separate analytical engine which might, for exemplary purposes only, comprise either computing device 240 or a separate computing device similar to computing device 240, but provided with alternative software specialized in the analysis and presentation of information.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An automated accumulator configured for insertion into an existing production line conveyor system and adapted to selectively accumulate product being conveyed along said existing production line conveyor system, comprising:
   a plurality of storage flights that define a stacked conveyor;
   an infeed ramp having a first end positioned to receive said product from said existing production line conveyor system and a second end distal to said first end adjustable to deliver said product to a first one of said plurality of storage flights;
   an outfeed ramp having a first end positioned to receive said product from a second one of said plurality of storage flights and a second end distal to said first end adjustable to deliver said product to said existing production line conveyor system downstream of said infeed ramp first end;
   said infeed ramp second end and said outfeed ramp first end independently operable to provide access to different ones of said plurality of storage flights and thereby allowing both an upstream and a downstream portion of said production line conveyor system to operate independently of the other;
   wherein said infeed ramp further comprises an infeed elevator configured to raise and lower said infeed ramp second end and responsive to said infeed elevator raising and lowering said infeed ramp second end deliver said product to a one of said plurality of storage flights different from said first one of said plurality of storage flights;
   wherein said infeed elevator further comprises a servo motor and lead screw adapted to raise and lower said infeed ramp second end; and
   further comprising an electronic control system configured to control rotation of said servo motor, and thereby selectively rotate said lead screw to raise and lower said infeed ramp second end;
   wherein said electronic control system further comprises at least one sensor configured to monitor and count a number of product sheets received within at least one of said infeed ramp and said plurality of storage flights, and responsive to said count adjust said infeed ramp second end and said outfeed ramp first end relative to said plurality of storage flights.

2. The automated accumulator of claim 1, wherein said outfeed ramp further comprises an outfeed elevator configured to raise and lower said outfeed ramp first end and responsive to said outfeed elevator raising and lowering said outfeed ramp first end receive said product from a one of said plurality of storage flights different from said second one of said plurality of storage flights.

3. The automated accumulator of claim 2, wherein said outfeed elevator further comprises a servo motor and lead screw adapted to raise and lower said outfeed ramp first end.

4. The automated accumulator of claim 3, further comprising an electronic control system configured to control rotation of said servo motor, and thereby selectively rotate said lead screw to raise and lower said outfeed ramp first end.

5. The automated accumulator of claim 1, wherein said first one of said plurality of storage flights is the same as said second one of said plurality of storage flights.

6. The automated accumulator of claim 1, wherein said first one of said plurality of storage flights is different from said second one of said plurality of storage flights.

7. The automated accumulator of claim 1, wherein said infeed ramp second end traces an arc when raised and lowered by said infeed elevator, said plurality of storage flights terminating adjacent to said infeed ramp second end in a complementary arc and is thereby configured to maintain constant spacing between said infeed ramp second end and a most adjacent one of said plurality of storage flights independent of an elevation of said infeed ramp second end.

8. The automated accumulator of claim 1, wherein said electronic control system further comprises an operator controlled switch having at least a first switch position and a second switch position, said electronic control system configured responsive to a change in said switch position to adjust said infeed ramp second end and said outfeed ramp first end relative to said plurality of storage flights.

9. The automated accumulator of claim 1, further comprising a programmable logic controller and a plurality of sensors in combination with a plurality of powered motors to provide First In First Out operation of said automated accumulator from said infeed ramp first end to said outfeed ramp second end, and to thereby preserve production sequence along said production line conveyor system.

10. An automated accumulator configured for insertion into an existing production line conveyor system and adapted to selectively accumulate product being conveyed along said existing production line conveyor system, comprising:
- a plurality of storage flights that define a stacked conveyor;
- an infeed ramp having a first end positioned to receive said product from said existing production line conveyor system and a second end distal to said first end adjustable to deliver said product to a first one of said plurality of storage flights;
- an outfeed ramp having a first end positioned to receive said product from a second one of said plurality of storage flights and a second end distal to said first end adjustable to deliver said product to said existing production line conveyor system downstream of said infeed ramp first end;
- said infeed ramp second end and said outfeed ramp first end independently operable to provide access to different ones of said plurality of storage flights and thereby allowing both an upstream and a downstream portion of said production line conveyor system to operate independently of the other;
- wherein said infeed ramp further comprises an infeed elevator configured to raise and lower said infeed ramp second end and responsive to said infeed elevator raising and lowering said infeed ramp second end deliver said product to a one of said plurality of storage flights different from said first one of said plurality of storage flights;
- wherein said infeed elevator further comprises a servo motor and lead screw adapted to raise and lower said infeed ramp second end;
- further comprising an electronic control system configured to control rotation of said servo motor, and thereby selectively rotate said lead screw to raise and lower said infeed ramp second end; and
- further comprising a machine readable indicia applied to said product, wherein said electronic control system further comprises at least one sensor configured to detect a presence of said machine readable indicia, and responsive thereto adjust said infeed ramp second end and said outfeed ramp first end relative to said plurality of storage flights.

11. In combination, an automated production line accumulator and a production line conveyor system, said production line conveyor system configured to convey product, wherein said automated production line accumulator comprises:
- a plurality of storage flights that define a stacked conveyor;
- an infeed ramp having a first end positioned to receive said product from said production line conveyor system and a second end distal to said first end adjustable to deliver said product to a first one of said plurality of storage flights, and an infeed elevator configured to raise and lower said infeed ramp second end and responsive to said infeed elevator raising and lowering said infeed ramp second end deliver said product to a one of said plurality of storage flights different from said first one of said plurality of storage flights;
- an outfeed ramp having a first end positioned to receive said product from a second one of said plurality of storage flights and a second end distal to said first end adjustable to deliver said product to said existing production line conveyor system downstream of said infeed ramp first end, and an outfeed elevator configured to raise and lower said outfeed ramp first end and responsive to said outfeed elevator raising and lowering said outfeed ramp first end receive said product from a one of said plurality of storage flights different from said second one of said plurality of storage flights; and
- an electronic control system configured to independently operate said infeed ramp second end and said outfeed ramp first end to provide access to different ones of said plurality of storage flights and thereby allow both an upstream and a downstream portion of said production line conveyor system to operate independently of the other;
- wherein said electronic control system further comprises at least one sensor configured to monitor and count a number of product sheets received within at least one of said infeed ramp and said plurality of storage flights, and responsive to said count adjust said infeed ramp second end and said outfeed ramp first end relative to said plurality of storage flights.

12. The combination automated production line accumulator and production line conveyor system of claim 11, wherein said infeed elevator further comprises a servo motor and lead screw adapted to raise and lower said infeed ramp second end.

13. The combination automated production line accumulator and production line conveyor system of claim 12, wherein said electronic control system is configured to control rotation of said infeed elevator servo motor, and thereby selectively rotate said infeed elevator lead screw to raise and lower said infeed ramp second end.

14. The combination automated production line accumulator and production line conveyor system of claim 11, wherein said electronic control system further comprises an operator controlled switch having at least a first switch position and a second switch position, said electronic control system configured responsive to a change in said switch position to adjust said infeed ramp second end and said outfeed ramp first end relative to said plurality of storage flights.

15. In combination, an automated production line accumulator and a production line conveyor system, said production line conveyor system configured to convey product, wherein said automated production line accumulator comprises:
- a plurality of storage flights that define a stacked conveyor;
- an infeed ramp having a first end positioned to receive said product from said production line conveyor system and a second end distal to said first end adjustable to deliver said product to a first one of said plurality of storage flights, and an infeed elevator configured to raise and lower said infeed ramp second end and responsive to said infeed elevator raising and lowering said infeed ramp second end deliver said product to a one of said plurality of storage flights different from said first one of said plurality of storage flights;
- an outfeed ramp having a first end positioned to receive said product from a second one of said plurality of storage flights and a second end distal to said first end adjustable to deliver said product to said existing production line conveyor system downstream of said infeed ramp first end, and an outfeed elevator configured to raise and lower said outfeed ramp first end and responsive to said outfeed elevator raising and lowering said outfeed ramp first end receive said product from a one of said plurality of storage flights different from said second one of said plurality of storage flights; and
- an electronic control system configured to independently operate said infeed ramp second end and said outfeed ramp first end to provide access to different ones of said plurality of storage flights and thereby allow both an upstream and a downstream portion of said production line conveyor system to operate independently of the other;
- further comprising a machine readable indicia applied to said product, wherein said electronic control system further comprises at least one sensor configured to detect a presence of said machine readable indicia, and responsive to detecting said presence of said machine readable indicia adjust said infeed ramp second end and said outfeed ramp first end relative to said plurality of storage flights.

\* \* \* \* \*